UNITED STATES PATENT OFFICE.

WINFIELD S. POTTER, OF NEW YORK, N. Y.

METHOD OF FORMING MACHINED SHAPES OF MANGANESE-STEEL.

1,079,439. Specification of Letters Patent. Patented Nov. 25, 1913.

No Drawing. Application filed March 30, 1912. Serial No. 687,504.

*To all whom it may concern:*

Be it known that I, WINFIELD S. POTTER, a citizen of the United States, residing in the borough of Manhattan, city, county, and State of New York, have invented certain new and useful Improvements in Methods of Forming Machined Shapes of Manganese-Steel; and I do hereby declare the following to be a full, clear, and exact description of the invention, such as will enable others skilled in the art to which it appertains to make and use the same.

It is now known that, by appropriate heat treatment terminated by suitable rapid cooling or quenching or by rolling or working to low temperatures and air cooling, manganese steel shapes may be produced having an extremely tough fine-grained uniform austenitic structure throughout. A suitable heat treatment for this purpose is disclosed, for example, in U. S. Letters Patent No. 1,017,906 granted to me on February 20th, 1912. The manganese steel resulting from such a treatment is so tough that machining operations, such as cutting, planing and turning, can be conducted only with the greatest difficulty.

The object of the present invention is to facilitate and cheapen such machining operations.

To this end the invention consists primarily in subjecting the shape to be machined, prior to the machining operation, to a heat treatment designed to diminish its toughness to a predetermined and definite degree, by so modifying the uniform austenitic structure as to establish a texture having relatively weak cleavage planes determined by the surfaces of a plate-like or martensitic crystalline structure and by weak crystals of the carbides of manganese and iron, which are separated out by such heat treatment.

A shape so treated has less toughness and less strength to resist cleavage ahead of the cutting edge of the machine tool and may consequently be readily and rapidly machined. After such treatment the steel is, however, in a condition such that it is not so well able to resist wear or shock in service, and it is therefore desirable to restore the finished shape to the preferable condition for use, that is, to the uniform fine-grained austenitic condition. For this purpose, I propose to subject the shape, after the machining operation, to an appropriate final or finishing heat treatment, as will be further described.

By way of illustrating the preferred practice of my invention, I will consider the treatment of a wrought shape in which the tough, uniform austenitic texture has been established by such a process as is disclosed in the above-mentioned United States Letters Patent. The first step is to so modify this austenitic structure, in the direction of a less cohesive martensitic structure, as to establish relatively weak cleavage planes. To this end the shape is heated, in any desired manner, as for example, in an appropriate heating furnace, to a temperature somewhat above 720° C., that is, up to and through the recrystallization range of temperature which lies approximately between 720° and 640° C. The shape is then carefully maintained at a temperature lying between these limits for a definite period of time depending upon the size and shape of the piece and upon the softness required for the machining operation. This period of time, to attain the best effect, should be from 15 minutes to 1 hour for each inch of thickness of the shape. That is, for example, a shape 4 inches thick, should be subjected to this heat treatment between the limits of 720° and 640° C. for 1 hour to 4 hours, according to the softness required for machining, and the depth to which it is desired that the machinable state should extend inward from the surface. Such treatment produces by recrystallization a modification of the austenitic structure in the desired direction, but care should be taken not to continue the treatment too long, that is to say, so long as to cause the martensitic structure produced to have so little cohesion that it will crumble or tear under the tool. After the desired condition has been thus established, the piece should be cooled as desired to ordinary temperatures, whereupon it may be machined cold or with a temperature during the machining operation, in the parts being machined, of say 200° to 500° C.

For the purpose of restoring to the machined shape the tough, uniform austenitic texture, the shape is then heated as desired, to a temperature above 720° C. and is retained at a temperature between 720° C. and 975° C. until of uniform temperature throughout, for example, until of the uniform temperature of about 975° C. and the temperature is then raised for a short time, for example for 5 minutes to 15 minutes per inch of thickness of the shape, to a point between 975° C. and 1075° C. and preferably to about 1025° C. and is then rapidly cooled to below 420° C. This heat may be suitably executed in a furnace having a neutral or reducing atmosphere or when it is important that the machined surfaces shall not be oxidized or scaled during this final treatment the machined shape may be heated in a bath of melted metal or salts held in a suitable receptacle on the furnace hearth, or in a bath of electrically heated salts.

In the event that it is desired to prepare a cast shape for machining, the uniform austenitic structure should be produced in it by maintaining it for the proper length of time at a temperature in the neighborhood of 1025° C. The shape should then be cooled to a temperature between 720° C. and 640° C. and held there for the period of time above indicated, and then cooled and machined, and the uniform austenitic structure subsequently restored.

Although the retardation point or temperature lies approximately at 720° C. and the range of temperature for recrystallization lies approximately between 720° C. and 640° C., so that the best practice is to maintain a temperature between those limits for the period of time indicated, yet it is possible to attain substantially the same effects by subjecting the shape to a slowly rising and falling temperature between the limits of 800° C. and 600° C. the practice being otherwise in accordance with the foregoing description.

Although the smoothest and most satisfactory cutting is done when the piece is first brought into a uniform fine-grained austenitic state and is then made martensitic to the extent requisite for the desired machining, good results can also be obtained by a heat treatment of a wrought shape or a casting which is in the so-called "natural" or air-cooled condition. For example, a wrought shape is formed and air cooled and is then heated to say 850° C. and is then slowly cooled to below 720° C. or the air cooled shape may be slowly heated to above 720° C. and then cooled to ordinary temperature whereupon it may be machined while cold.

Having thus described my invention what I claim is:

1. The method of forming a machined shape of manganese steel, which comprises establishing therein by a suitable heat treatment a texture having relatively weak cleavage planes, intermediate a tough austenitic structure and a fragile coarse grained martensitic structure, machining the shape while in that condition, and subsequently establishing in the shape by a suitable heat treatment a uniform tough austenitic structure; substantially as described.

2. The method of forming a machined shape of manganese steel, which comprises modifying the texture thereof by a suitable heat treatment to establish relatively weak cleavage planes, machining the shape while in that condition, and subsequently subjecting it to a further heat treatment to establish a tough austenitic texture therein; substantially as described.

3. The method of treating a manganese steel shape to facilitate machining thereof, which comprises establishing therein for the machining operation, by a suitable heat treatment, a texture having relatively weak cleavage planes, between a tough austenitic structure and a fragile coarse grained martensitic structure; substantially as described.

4. The method of treating a manganese steel shape to facilitate machining thereof, which comprises maintaining it at a temperature lying between 640° C. and 720° C. for a period of time of from 15 minutes to 1 hour per inch of thickness of the shape; substantially as described.

5. The method of forming a machined shape of manganese steel, which comprises subjecting the shape to a temperature lying between 640° C. and 720° C. for a period of time of from 15 minutes to 1 hour per inch of thickness of the shape, cooling and machining the shape, and subsequently heating the machined shape to a temperature approximately 975° C. until it has attained a uniform temperature throughout, then subjecting it for 5 minutes to 15 minutes per inch of thickness of the shape to a temperature between 975° C. to 1075° C. and then rapidly cooling to below 420° C; substantially as described.

6. The method of forming a machined shape of manganese steel, which comprises subjecting the shape for a period of time of 15 minutes to 1 hour per inch of thickness of the shape, to a temperature lying between 640° C. and 720° C. to thereby establish relatively weak cleavage planes, machining the shape while in that condition, and subsequently establishing by a suitable heat treatment a tough austenitic structure therein; substantially as described.

In testimony whereof I affix my signature, in presence of two witnesses.

WINFIELD S. POTTER.

Witnesses:
WILLIAM H. DAVIS,
M. A. BILL.